(12) United States Patent
Gupta

(10) Patent No.: US 11,315,105 B2
(45) Date of Patent: *Apr. 26, 2022

(54) SMART CARD WITH SELF-CONTAINED CONNECTION ARCHITECTURE

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 97 days.

This patent is subject to a terminal disclaimer.

(21) Appl. No.: 16/861,818

(22) Filed: Apr. 29, 2020

(65) Prior Publication Data

US 2021/0342815 A1 Nov. 4, 2021

(51) Int. Cl.
*G06Q 20/34* (2012.01)
*G06Q 40/02* (2012.01)
*G06K 19/07* (2006.01)

(52) U.S. Cl.
CPC ....... *G06Q 20/341* (2013.01); *G06K 19/0719* (2013.01); *G06Q 40/02* (2013.01)

(58) Field of Classification Search
CPC ................. G06Q 20/341–3415; G06Q 40/02
See application file for complete search history.

(56) References Cited

U.S. PATENT DOCUMENTS

| | | | |
|---|---|---|---|
| 11,107,065 B1* | 8/2021 | Gupta | G06K 19/07707 |
| 2008/0010196 A1* | 1/2008 | Rackley, III | G06Q 20/102 |
| | | | 705/40 |
| 2009/0159663 A1* | 6/2009 | Mullen | G06K 19/07 |
| | | | 235/379 |
| 2014/0229374 A1* | 8/2014 | James | G06Q 20/108 |
| | | | 705/42 |
| 2016/0267486 A1* | 9/2016 | Mitra | H04W 12/041 |
| 2018/0374079 A1* | 12/2018 | Hewitt | G06Q 20/3415 |
| 2019/0286805 A1* | 9/2019 | Law | G06F 21/34 |
| 2020/0034826 A1* | 1/2020 | Wurmfeld | G06Q 20/3278 |

OTHER PUBLICATIONS

"World's First ISO Compliant Payment DisplayCard using SiPix and SmartDisplayer's Flexible Display Panel", Business Wire, May 10, 2006. (Year: 2006).*

Schuman, Evan, "New For Your Wallet, Secure Credit Cards With Displays and a Button", eWeek : NA. Ziff Davis Enterprise, May 2, 2007. (Year: 2007).*

* cited by examiner

*Primary Examiner* — Eric T Wong
(74) *Attorney, Agent, or Firm* — Weiss & Arons LLP

(57) ABSTRACT

Systems and methods for executing transactions with increased transactional efficiency and security via a smart payment instrument with self-contained transaction architecture are provided. Methods may include receiving information via a tactile sensor that is affixed to the instrument. Information may include a series of alphanumeric symbols. The receiving may be achieved by entering the symbols via the tactile sensor. Methods may include deciphering the information, via a payment interface component of the instrument, to generate payment data. Payment data may include a recipient and a payment amount. Methods may include transmitting to a payment gateway, via a wireless communication element embedded in the instrument, a request to execute a payment based on the payment data.

12 Claims, 5 Drawing Sheets

SMART CARD WITH SELF-CONTAINED CONNECTION ARCHITECTURE

FIELD OF TECHNOLOGY

Aspects of the disclosure relate to computer systems. Specifically, aspects of the disclosure relate to systems and methods for providing smart payment instruments.

BACKGROUND OF THE DISCLOSURE

It is common for consumers to carry at least one payment instrument, such as a credit or debit card. Consumers typically execute transactions, including the payment of bills, using those payment instruments.

However, conventional payment instruments are usually unable to execute the transactions without the assistance of other devices. Exemplary devices include laptops, desktops, and mobile phones. Requiring the use of other devices is inconvenient and inefficient. Using other devices may also expose the transaction to security risks.

It would be desirable, therefore, to provide systems and methods for smart payment instruments with self-contained transaction architecture, thereby increasing the efficiency and security of transactions executed via the smart payment instruments.

SUMMARY OF THE DISCLOSURE

Aspects of the disclosure relate to a smart payment instrument with self-contained transaction architecture for increasing transactional efficiency and security. The instrument may include a microprocessor, a tactile sensor, a power source for the microprocessor and the tactile sensor, a wireless communication element configured to provide wireless communication to a payment gateway, and a non-transitory memory storing computer-executable instructions.

The instructions, when run on the microprocessor, may be configured to receive information via the tactile sensor and decipher the information. Deciphering the information may be accomplished via a payment interface component, and may generate payment data. Payment data may include a recipient and a payment amount.

The instrument may be configured to transmit to the payment gateway, via the wireless communication element, a request to execute a payment based on the payment data.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
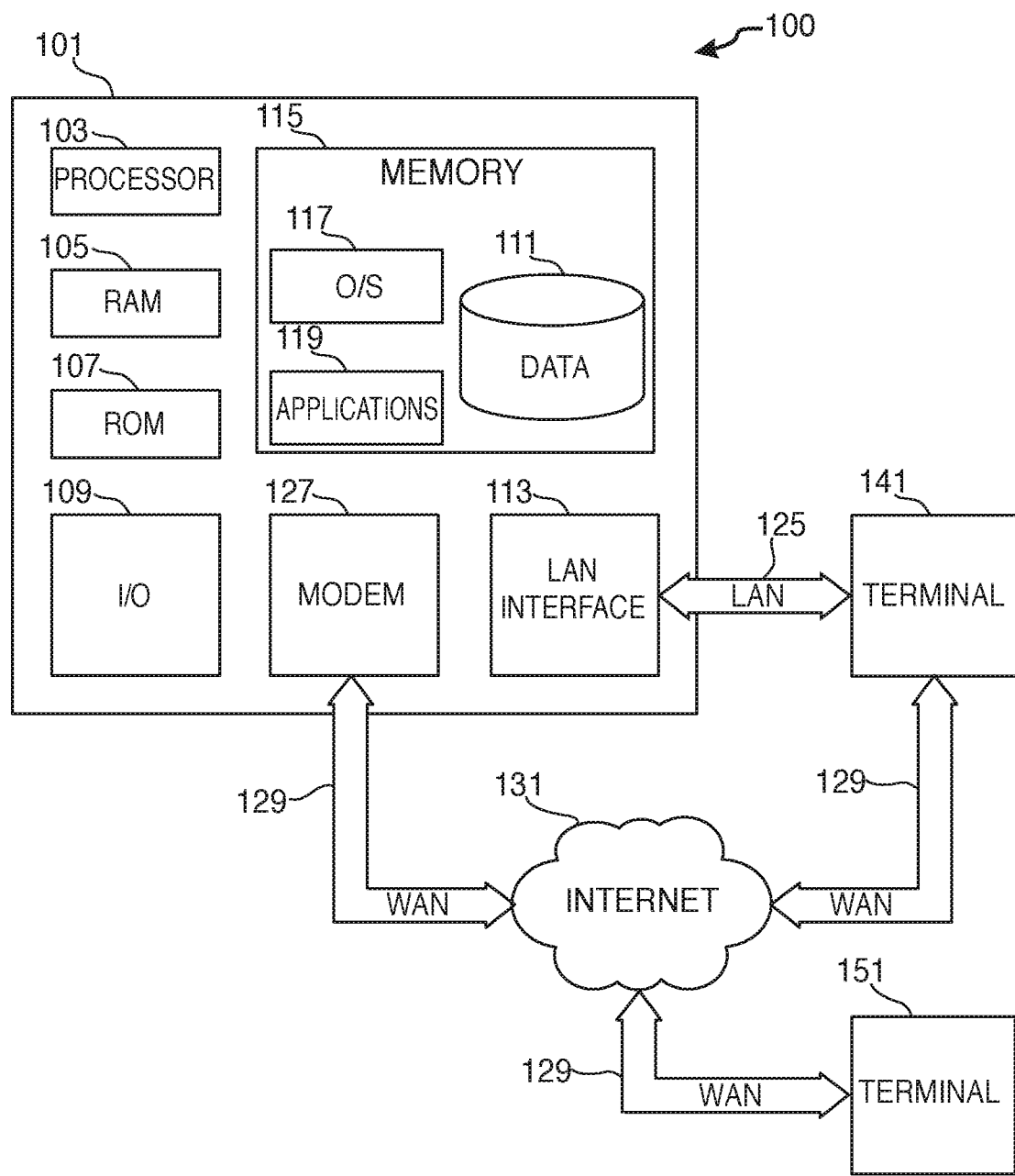
FIG. 1 shows an illustrative system in accordance with principles of the disclosure.

A smart payment instrument with self-contained transaction architecture is provided. The instrument may increase transactional efficiency and security. For example, efficiency may be increased by eliminating the need to use a device external to the instrument for executing transactions. Security may be increased by providing a system with dedicated transactional hardware, software, and/or communication channels. Such a system may be associated with a decreased risk of infection with malware, spyware, or other security risk factors.

The instrument may be part of a system for increasing transactional efficiency and security. The instrument may include a microprocessor, a tactile sensor, a power source for the microprocessor and the tactile sensor, a wireless communication element configured to provide wireless communication to a payment gateway, and/or a non-transitory memory storing computer-executable instructions. The instructions, when run on the microprocessor, may be configured to perform some or all of the disclosed features of the system.

The instrument may, in certain preferred embodiments, be a card. The card may include metal and/or plastic. The card may at least partially resemble a typical debit or credit card. The card may have dimensions that conform to the ISO/IEC 7810 ID-1 standard. The dimensions may, in some embodiments, be no greater than 86 millimeters×54 millimeters×0.8 millimeters.

In certain embodiments of the instrument, the wireless communication element may include a nano wireless network interface card ("NIC"). The wireless communication element may include any suitable component capable of facilitating wireless communication.

In some embodiments, the power source may be rechargeable. The power source may recharge via solar energy. The power source may recharge via inductive charging, e.g., with a wireless recharging mechanism. The power source may recharge via a charging port. A charging port may include mini or micro Universal Serial Bus (USB) connectors, or any other suitable connector. The power source may recharge via any other suitable charging mechanism.

In some embodiments, the microprocessor, the power source, the wireless communication element, and/or the memory may be embedded in the card. The tactile sensor may be affixed to the card and may be exposed on a surface of the card. Being exposed on the surface of the card may enable a user of the card to enter information via the tactile sensor.

The tactile sensor may, in certain embodiments, be a keypad. The keypad may include numbers, such as 0-9. The keypad may include letters. The keypad may include arrows, and/or other functional keys. Functional keys may include "enter," "ok," "back," "cancel," and/or other suitable functional keys.

The instrument may be configured to receive information via the tactile sensor. In some embodiments, the information may include a series of alphanumeric symbols. The instrument may receive the information when said symbols are entered via the tactile sensor. The instrument may also include a screen, and the screen may be configured to display information received via the tactile sensor, and/or other suitable information.

In certain embodiments, the series of alphanumeric symbols may be sourced from a bill, e.g., a utility bill or a line of credit bill (such as a credit card bill or mortgage bill). The bill may have been generated by a payment recipient for a user of the instrument. The payment recipient may be an entity, such as a utility provider or financial institution.

In some embodiments, the series of alphanumeric symbols may correspond at least in part to the recipient and/or a service category associated with the recipient.

In certain embodiments, the series of alphanumeric symbols may include a name or a code associated with the recipient. The recipient may be one of a plurality of recipients. Each of the plurality of recipients may be associated with a unique name or a unique code.

The name or code may, in certain embodiments, be an official name of the recipient. As an illustrative example, the plurality of recipients may include an entity called "The Electric Company," and entity called "The Gas Company," and an entity called "The Water Company," and the name or code may be those official names. In other embodiments, the name or code may be a predetermined abbreviation for the recipient. The name or code may be a number preprogrammed to be associated with the recipient. In some embodiments, the system may be configured to receive more than one of the exemplary names or codes previously listed.

In some embodiments, the series of alphanumeric symbols may include a name or a code of a service category associated with the recipient. The service category may be one of a plurality of service categories. Each of the plurality of service categories may be associated with a unique name or a unique code.

The name or code may, in certain embodiments, be a full name of the service category. As an illustrative example, the plurality of service categories may include: electric, gas, heating, water, rent, credit card, and tuition. The name or code may be full names. In other embodiments, the name or code may be a predetermined abbreviation for the service category. The name or code may be a number preprogrammed to be associated with the service category. In some embodiments, the system may be configured to receive more than one of the exemplary names or codes previously listed. Each of the plurality of service categories may also be associated with one of the plurality of recipients. For example, electric may be associated with the exemplary recipient "The Electric Company," gas may be associated with the exemplary recipient "The Gas Company," and water may be associated with the exemplary recipient "The Water Company."

In certain embodiments, the plurality of recipients, service categories, and/or the associated unique names or unique codes may be customizable by the user. The customization may be executed via the tactile sensor. In some embodiments, the customization may be executed via a wired or wireless connection with another device. For example, the system may include an associated application installed on a smartphone that may be enabled to customize certain settings on the payment instrument, such as the plurality of recipients, service categories, and/or the associated unique names or unique codes.

The instrument may be configured to decipher the information. Deciphering the information may be accomplished via a payment interface component. Deciphering the information may generate payment data. Payment data may include a recipient and a payment amount.

In some embodiments, the payment interface component, in deciphering the information, may be configured to identify the recipient based on the name or the code. Identifying the recipient based on the name or the code may, in certain embodiments, include determining the recipient based on the service category.

In certain embodiments, the system may be configured to determine a communication pathway. The communication pathway may be determined based on the recipient. For example, the plurality of recipients may be mapped to a plurality of communication pathways. The determination may be based on the mapping.

The system may be configured to transmit a query to the recipient. The query may be transmitted over the communication pathway. The query may be for an amount owed by a user of the instrument. The query may include information identifying the user. The information may include a name and/or address. The information may include a customer number.

The system may be configured to receive the amount owed as a response to the query. The system may be configured to determine the payment amount based, at least in part, on the amount owed. For example, the system may be preset to establish the payment amount as the full amount owed. In other embodiments, the system may be configured to calculate the payment amount as a percentage of the amount owed. The percentage may be based on a minimum percentage that does not incur penalty fees. The percentage may be different for different recipients. The percentages may be customizable by the user. In some embodiments, the system may be configured to determine the percentage for each payment as part of the query.

The instrument may be configured to verify the payment amount. Verification may include displaying the payment amount on a screen that is affixed to the instrument, and receiving authorization. The authorization may be received via the tactile sensor.

The instrument may be configured to transmit a request to the payment gateway. The request may be to execute a payment based on the payment data. The transmission may be executed via the wireless communication element.

For example, an illustrative system may be configured to include three service categories mapped to three recipients. The three service categories may be electric, gas, and water, and they may be mapped to recipients "The Electric Company," "The Gas Company," and "The Water Company," respectively. The service categories and/or the recipients may have been customized by the user. The system may associate a communication pathway with each of the recipients.

The system may also be configured with a unique code for each service category. For example, electric may be #1, gas may be #2, and water may be #3. In some embodiments, the tactile sensor may include dedicated buttons that are prelabeled with names of service categories.

The user may wish to pay his gas bill. The user may press the number "2" on a keypad of the instrument. The user may press a button labeled "gas." The user may scroll through options on a screen of the instrument via arrow buttons and select "gas" from the options. The user may enter "gas" via an alphanumeric keypad (which may include numbers and a group of letters associated with each number). In some embodiments, the user may enter a code that was generated by the gas company and communicated to the user. The code may have been communicated along with a gas bill.

The instrument may transmit a wireless communication to the gas company querying for an amount owed by the user. The gas company may respond with a figure owed, e.g., $30. The instrument may verify that the user approves the $30 charge. When approval is received, the instrument may transmit a request to a payment gateway to execute a $30 payment to The Gas Company.

A method for executing transactions with increased transactional efficiency and security is provided. The method may be performed via a smart payment instrument with self-contained transaction architecture. The method may be executed via computer-executable instructions that may be stored in a non-transitory memory of the instrument. The instructions may be run on a microprocessor that may be embedded in the instrument.

The method may include receiving information via a tactile sensor that is affixed to the instrument. The information may include a series of alphanumeric symbols. The receiving may, in certain embodiments, be achieved by entering the symbols via the tactile sensor.

The method may include deciphering the information. The information may be deciphered via a payment interface component of the instrument. The deciphering may generate payment data. The payment data may include a recipient and a payment amount.

The method may include transmitting to a payment gateway, via a wireless communication element embedded in the instrument, a request to execute a payment based on the payment data.

Some embodiments of the method may include sourcing the series of alphanumeric symbols from a bill. The bill may be generated by the recipient for a user of the instrument. In certain embodiments, the series of alphanumeric symbols may correspond at least in part to the recipient and/or a service category associated with the recipient.

In certain embodiments of the method, the series of alphanumeric symbols may include a name or a code associated with the recipient. The recipient may be one of a plurality of recipients. Each of the plurality of recipients may be associated with a unique name or a unique code. The plurality of recipients may be mapped to a plurality of communication pathways. The method may further include: identifying the recipient based on the name or the code; determining a communication pathway from the plurality of communication pathways, said determination based on the mapping; transmitting to the recipient, over the communication pathway, a query for a figure representing the amount owed by a user of the instrument to the recipient; receiving the figure; and determining the payment amount based, at least in part, on the figure.

In some embodiments of the method, the name or code may include: an official name of the recipient; a predetermined abbreviation for the recipient; a number preprogrammed to be associated with the recipient; or a name or code of a service category associated with the recipient, wherein the service category is one of a plurality of service categories, and each of the plurality of service categories is associated with a unique name or a unique code, and each of the plurality of service categories is also associated with one of a plurality of recipients, and for the identifying the recipient based on the name or the code, the method further comprises determining the recipient based on the service category. The plurality of recipients, the plurality of service categories, and/or the associated unique name or unique codes may, in certain embodiments, be customizable by the user.

The method may also include, in some embodiments, verifying the payment amount. Verifying the payment amount may include displaying the payment amount on a screen that is affixed to the instrument, and receiving authorization via the tactile sensor.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to transactional information. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to executing transactions.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
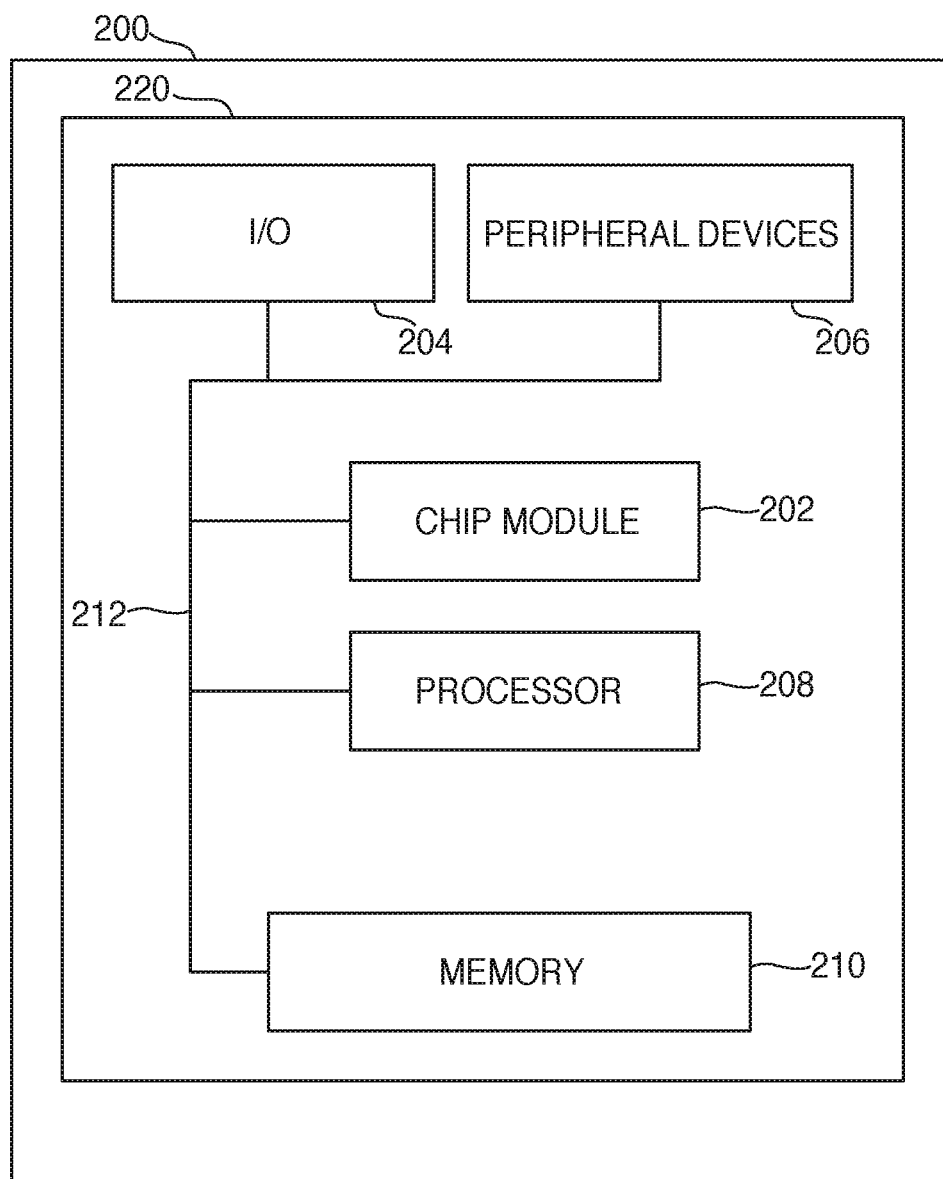
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
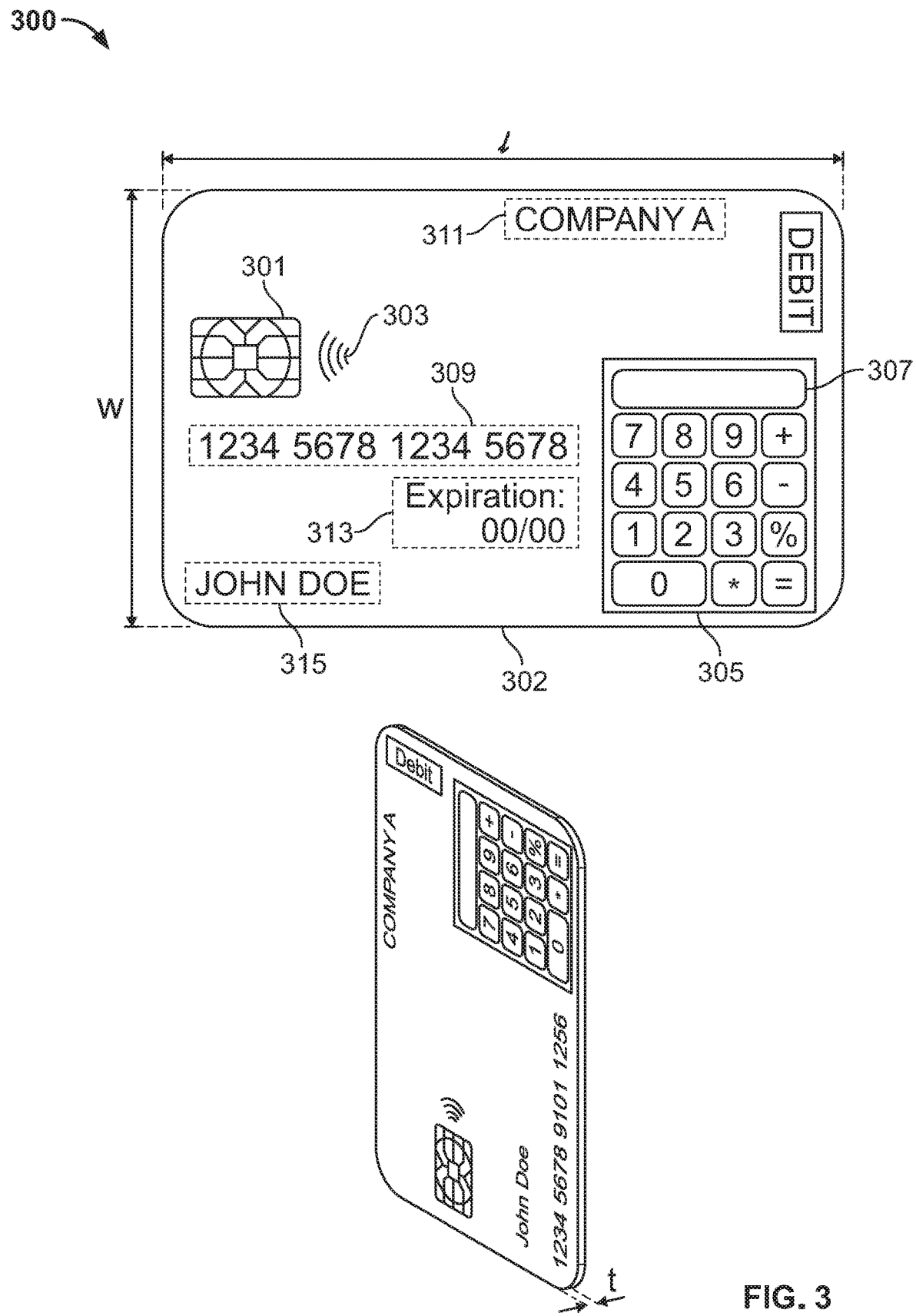
FIG. 3 shows another illustrative apparatus in accordance with principles of the disclosure.

FIG. 3 shows an exemplary payment instrument, illustrative smart card 300, according to aspects of the disclosure. Smart card 300 includes keypad 305. Keypad 305 may be used by a user of smart card 300 to enter information. Exemplary information may include a unique code presented by a payment recipient such as a utility provider, or a suitable name or code associated with a payment recipient or service category.

Smart card 300 includes a microprocessor and other components for capturing and storing information entered by a user. Smart card 300 may, in certain embodiments, be configured to encrypt the information. Smart card 300 may also include executable instructions for packaging information entered via keypad 305 into transaction instructions (which may be referred to herein as a requests) that may be executed by a secure transaction gateway. The executable instructions may also formulate the transaction instructions based on transaction information stored on the smart card. The transaction information may be sensitive.

FIG. 3 shows that smart card 300 includes chip 301. Chip 301 may provide an electrical contact that is accessible through housing 302. Chip 301 may provide an electrical contact for establishing a wired or contact based communication channel with an ATM or POS terminal when card 300 is inserted into a card reader of the ATM or POS terminal. Chip 301 may be an EMV chip. Chip 301 may facilitate charging of one or more components of smart card 300.

Chip 301 may store a copy of information printed on a face of smart card 300. For example, chip 301 may store PAN 309, user name 315, expiration date 313 and issuing bank 311. Chip 301 may also store encrypted security information. The encrypted security information may be utilized to provide a "second factor" method of authentication prior to triggering execution of transaction instructions.

For example, smart card 300 may package information entered by user 315 via keypad 305 into transaction instructions. The transaction instructions may include a PIN associated with smart card 300. The staged transaction instructions may be submitted for execution to a transaction gateway without requiring any further input from user 315. The transaction instructions may be transferred to the transaction gateway using wireless circuitry 303. In some embodiments, the transaction instructions may be transferred via wired communication with chip 301.

After a transaction gateway receives transaction instructions formulated by smart card 300, the transaction gateway may, in certain embodiments, first verify that the PIN included in the transaction instructions is associated with smart card 300. For example, the transaction gateway may communicate with a remote payment processing server operated by the issuer and determine whether the received PIN is associated with user name 315 and/or PAN 309.

As a second factor method of authentication, the transaction gateway may determine whether the PIN included in the transaction instructions successfully unlocks encrypted security information stored on chip 301. If the PIN successfully unlocks the encrypted security information, the transaction gateway may execute the received transaction instructions.

Smart card 300 may be any suitable size. FIG. 3 shows that smart card 300 has width w and length l. For example, width w may be 53.98 millimeters ("mm"). Length l may be 85.60 mm. Smart card 300 has thickness t. An illustrative thickness t may be 0.8 mm. An exemplary form factor of smart card 300 may be 53.98 mm×85.60 mm×0.8 mm. Such an exemplary form factor may allow smart card 300 to conveniently fit into a user's wallet or pocket. This exemplary form factor may allow smart card 300 to fit into a card reader of an ATM or POS terminal.

Figure 4:
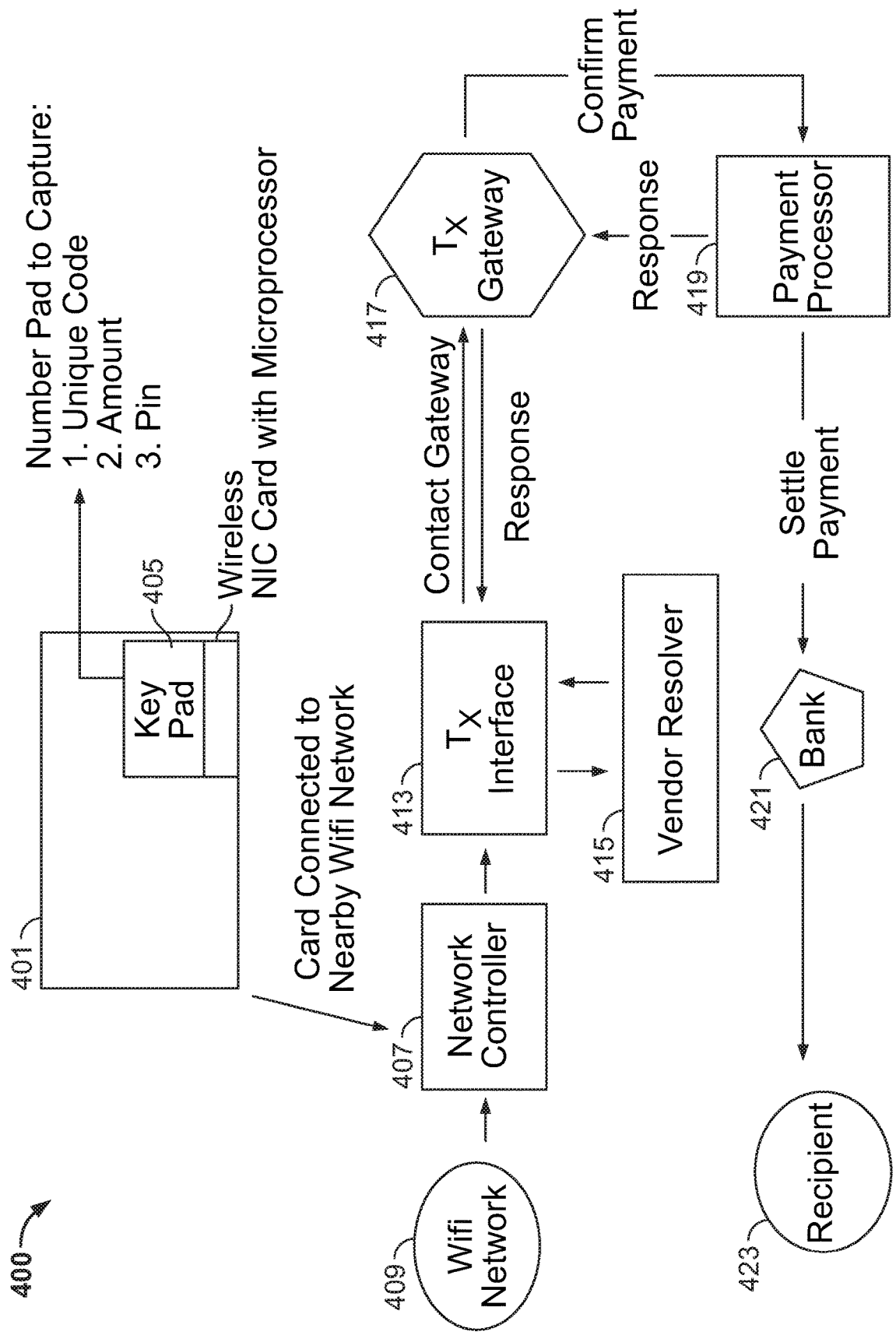
FIG. 4 shows an illustrative system architecture in accordance with principles of the disclosure.

FIG. 4 shows exemplary system architecture 400 according to aspects of the disclosure. System architecture 400 includes smart card 401. Smart card 401 may include one or more features of smart card 300. Smart card 401 includes keypad 405, which may include one or more features of keypad 305.

FIG. 4 shows an exploded view of smart card 401 components network interface controller (NIC) 407 and transaction interface 413. NIC 407 may include its own dedicated microprocessor and memory. NIC 407 may be a microelectromechanical device that fits within the small form factor associated with smart card 401. In other embodiments, smart card 401 may include another microprocessor for performing other functions. NIC 407 may prepare data generated by a microprocessor on smart card 401 for transmission to a transaction gateway or other secure computer system.

FIG. 4 shows that smart card 401 connects to Wi-Fi network 409 using NIC 407. NIC 407 may also be utilized for electronic communication with transaction interface 413. Transaction interface 413 may interact with payment interface component 415 to determine payment information associated with a unique code captured by smart card 401. Based on the payment recipient identified by payment interface component 415, smart card 401 establishes a secure communication channel with transaction gateway 417. Components 405, 407, 413 and 415 are all resident on smart card 401.

A network address associated with transaction gateway 417 may be identified based on a payment recipient identified by payment interface component 415 and transaction interface 413. In other embodiments, the network address of a transaction gateway may be hardwired into NIC 407.

The system may be configured to determine whether smart card 401 is associated with sufficient funds to process the transaction. Transaction gateway 417 may perform one or more checks to verify transaction instructions received from smart card 401. For example, transaction gateway 417 may prompt a user of smart card 401 to provide authorization, which may include entering a PIN into keypad 405. In some embodiments, smart card 401 may self-initiate the verification.

After authenticating transaction instructions received from smart card 401, transaction gateway 417 may submit the transaction instructions to payment processor 419 for settlement. Payment processor 419 may ensure that funds corresponding to the payment amount are debited from an account associated with smart card 401. Payment processor 419 may ensure that funds corresponding to the payment amount are credited to an account associated with payment recipient 423. Bank 421 may facilitate settlement of funds among payment recipient 423 and accounts associated with smart card 401. Bank 421 may be an issuer of smart card 401. Bank 421 may be an acquirer associated with payment recipient 423.

Figure 5:
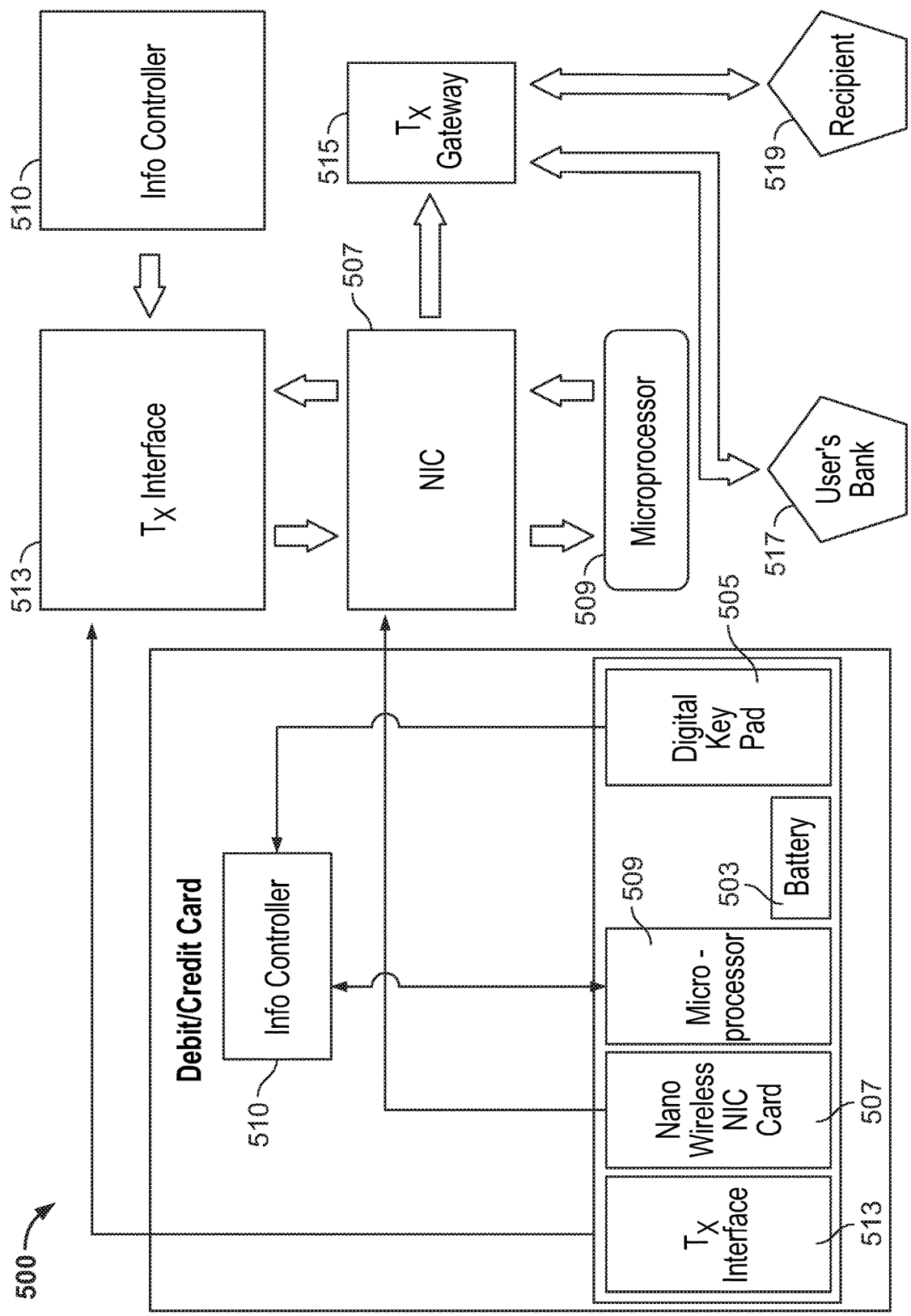
FIG. 5 shows another illustrative system architecture in accordance with principles of the disclosure.

FIG. 5 shows another exemplary system architecture including smart card 500 according to aspects of the disclosure. Smart card 500 may include one or more features of smart cards 300 or 401. Smart card 500 includes information controller 510. Information controller 510 may capture data entered using the keypad 505. Information controller 510 may, in some embodiments, encrypt data captured by keypad 505. Illustrative encryption algorithms include RSA cryptography, Blowfish, AES, RC4, RC5, and RC6. Input controller 510 may store captured data locally on smart card 500.

Smart card 500 includes microprocessor 509 which controls overall operation of smart card 500 and its associated components. For example, microprocessor 509 may control operation of NIC 507 and communication with transaction gateway 515.

Microprocessor 509 may formulate transaction instructions for a payment destined for recipient 519. The payment may be forwarded to recipient 519 via transaction gateway 515. In some embodiments, smart card 500 may be configured to directly communicate with recipient 519. For example, smart card 500 may communicate a query to recipient 519 for an amount owed, and may receive a figure in response. As another example, after a successful execution of the payment by transaction gateway 515, smart card 500 may receive confirmation from recipient 519. The confirmation may be displayed on a screen of smart card 500.

Microprocessor 509 may formulate transaction instructions destined for user's bank 517. Such transaction instructions may be forwarded to user's bank 517 by transaction gateway 515. In some embodiments, smart card 500 may be configured to directly communicate with user's bank 517. For example, user's bank 517 may request authentication, such as a PIN, before debiting an account associated with smart card 500 based on received transaction instructions.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention.

The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for a smart card with self-contained connection architecture are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for self-identifying transaction parameters and thereby increasing transactional efficiency and security, the system comprising a smart card with self-contained transaction architecture, said smart card comprising a metal and/or plastic card and having dimensions that conform to the ISO/IEC 7810 ID-1 standard, said dimensions being no greater than 86 millimeters X 54 millimeters X 0.8 millimeters, the system comprising:
   a microprocessor embedded in the smart card;
   a tactile sensor, said tactile sensor being a keypad that is affixed to the smart card and exposed on a surface of the smart card;
   a power source for the microprocessor and the tactile sensor, said power source that is embedded in the smart card and is rechargeable via solar energy, inductive charging, and/or a charging port;
   a wireless communication element configured to provide wireless communication to a payment gateway, wherein the wireless communication element is a nano wireless network interface card ("NIC") that is embedded in the smart card; and
   a non-transitory memory embedded in the smart card and storing computer-executable instructions, that, when executed by the microprocessor, cause the microprocessor to:
      receive information via the tactile sensor, said information comprising a series of alphanumeric symbols, and the smart card receives the information when said symbols are entered via the tactile sensor, wherein:
         the series of alphanumeric symbols comprises a name or a code associated with a recipient;
         the recipient is one of a plurality of recipients, and each of the plurality of recipients is associated with a unique name or code; and
         the plurality of recipients is mapped to a plurality of communication pathways;
      decipher the information, via a payment interface component, to generate payment data, said payment data comprising the recipient and a payment amount, wherein the payment interface component, in deciphering the information, is configured to:
         identify the recipient based on the name or the code;
         determine a communication pathway from the plurality of communication pathways, said determination based on the mapping;
         transmit to the recipient, over the communication pathway, a query for a figure representing an amount owed by a user of the smart card to the recipient; and
         determine the payment amount based, at least in part, on the figure representing the amount owed;
      verify the payment amount, said verification comprising displaying the payment amount on a screen that is affixed to the smart card, and receiving authorization via the tactile sensor; and
      transmit to the payment gateway, via the wireless communication element, a request to execute a payment based on the payment data.

2. The system of claim 1, wherein the name or code comprises any one of a list that includes:
   an official name of the recipient;
   a predetermined abbreviation for the recipient;
   a number preprogrammed to be associated with the recipient; and
   a name or code of a service category associated with the recipient, wherein the service category is one of a plurality of service categories, and each of the plurality of service categories is associated with a unique name or a unique code, and each of the plurality of service categories is also associated with one of a plurality of recipients, and to identify the recipient based on the name or the code, the system is further configured to determine the recipient based on the service category.

3. The system of claim 1, wherein the series of alphanumeric symbols is sourced from a bill, said bill that is generated by the recipient for a user of the smart card.

4. The system of claim 1, wherein the series of alphanumeric symbols corresponds at least in part to the recipient and/or a service category associated with the recipient.

5. The system of claim 1, wherein the plurality of recipients and/or the associated unique name or unique codes are customizable by the user.

6. The system of claim 1, wherein the series of alphanumeric symbols comprises a name or a code associated with a service category, and wherein:
   the service category is one of a plurality of service categories, and each of the plurality of service categories is associated with a unique name or a unique code, and each of the plurality of service categories is also associated with one of a plurality of recipients; and
   the plurality of recipients is mapped to a plurality of communication pathways.

7. A method for self-identifying transaction parameters and thereby increasing transactional efficiency and security via a system that comprises:
   a smart card with self-contained transaction architecture, said smart card comprising a metal and/or plastic card and having dimensions that conform to the ISO/IEC 7810 ID-1 standard, said dimensions being no greater than 86 millimeters X 54 millimeters X 0.8 millimeters;
   a microprocessor embedded in the smart card;
   a tactile sensor, said tactile sensor being a keypad that is affixed to the smart card and exposed on a surface of the smart card;
   a power source for the microprocessor and the tactile sensor, said power source that is embedded in the smart card and is rechargeable via solar energy, inductive charging, and/or a charging port;

a wireless communication element configured to provide wireless communication to a payment gateway, wherein the wireless communication element is a nano wireless network interface card ("NIC") that is embedded in the smart card; and a non-transitory memory embedded in the smart card and storing computer-executable instructions;

wherein the method is executed via the computer-executable instructions running on the microprocessor and the method comprises:

receiving information via the tactile sensor, said information comprising a series of alphanumeric symbols, and the smart card receives the information when said symbols are entered via the tactile sensor, wherein:
the series of alphanumeric symbols comprises a name or a code associated with a recipient;
the recipient is one of a plurality of recipients, and each of the plurality of recipients is associated with a unique name or code; and
the plurality of recipients is mapped to a plurality of communication pathways;

deciphering the information, via a payment interface component, to generate payment data, said payment data comprising the recipient and a payment amount, wherein the deciphering comprises:
identifying the recipient based on the name or the code;
determining a communication pathway from the plurality of communication pathways, said determination based on the mapping;
transmitting to the recipient, over the communication pathway, a query for a figure representing an amount owed by a user of the smart card to the recipient; and
determining the payment amount based, at least in part, on the figure representing the amount owed;

verifying the payment amount, said verifying comprising displaying the payment amount on a screen that is affixed to the smart card, and receiving authorization via the tactile sensor; and transmitting to the payment gateway, via the wireless communication element, a request to execute a payment based on the payment data.

8. The method of claim 7, wherein the name or code comprises any one of a list that includes:
an official name of the recipient;
a predetermined abbreviation for the recipient;
a number preprogrammed to be associated with the recipient; and
a name or code of a service category associated with the recipient, wherein the service category is one of a plurality of service categories, and each of the plurality of service categories is associated with a unique name or a unique code, and each of the plurality of service categories is also associated with one of a plurality of recipients, and to identify the recipient based on the name or the code, the method further comprises determining the recipient based on the service category.

9. The method of claim 7, wherein the series of alphanumeric symbols is sourced from a bill, said bill that is generated by the recipient for a user of the smart card.

10. The method of claim 7, wherein the series of alphanumeric symbols corresponds at least in part to the recipient and/or a service category associated with the recipient.

11. The method of claim 7, wherein the plurality of recipients and/or the associated unique name or unique codes are customizable by the user.

12. The method of claim 7, wherein the series of alphanumeric symbols comprises a name or a code associated with a service category, and wherein:
the service category is one of a plurality of service categories, and each of the plurality of service categories is associated with a unique name or a unique code, and each of the plurality of service categories is also associated with one of a plurality of recipients; and
the plurality of recipients is mapped to a plurality of communication pathways.

* * * * *